United States Patent [19]
Gallarda et al.

[11] Patent Number: 6,098,424
[45] Date of Patent: Aug. 8, 2000

[54] PROCESS AND PLANT FOR PRODUCTION OF CARBON MONOXIDE AND HYDROGEN

[75] Inventors: Jean Gallarda, Joinville le Pont; Franck Wegrzyn, La Varenne, both of France

[73] Assignee: L'Air Liquide, Societe Anonyme pour l'Etude et l'Exploitation des Procedes Georges Claude, Paris Cedex, France

[21] Appl. No.: 09/253,713

[22] Filed: Feb. 22, 1999

[30] Foreign Application Priority Data

Feb. 20, 1998 [FR] France .................................. 98 02100

[51] Int. Cl.[7] .......................................... F25J 1/00
[52] U.S. Cl. ................... 62/632; 62/920; 62/934
[58] Field of Search ..................... 62/632, 920, 934

[56] References Cited

U.S. PATENT DOCUMENTS

| | | | |
|---|---|---|---|
| 4,380,461 | 4/1983 | Haslam et al. | 62/934 |
| 4,636,334 | 1/1987 | Skinner et al. | 62/920 |
| 4,765,814 | 8/1988 | Bauer et al. | 62/934 |
| 4,805,414 | 2/1989 | Fisher . | |
| 4,891,950 | 1/1990 | Seufert et al. | 62/920 |
| 5,390,499 | 2/1995 | Rhoades et al. | 62/632 |
| 5,592,831 | 1/1997 | Bauer et al. | 62/920 |
| 5,609,040 | 3/1997 | Billy et al. | 62/920 |
| 5,832,747 | 11/1998 | Bassett et al. | 62/920 |

FOREIGN PATENT DOCUMENTS

| | | |
|---|---|---|
| 0 119 001 | 9/1984 | European Pat. Off. . |
| 0 307 983 | 3/1989 | European Pat. Off. . |
| 0 677 483 | 10/1995 | European Pat. Off. . |
| 38 14 293 | 11/1989 | Germany . |

*Primary Examiner*—Ronald Capossela
*Attorney, Agent, or Firm*—Young & Thompson

[57] ABSTRACT

A process and plant for the combined production of carbon monoxide and an ammonia synthesis from a feed gas mixture containing essentially hydrogen, carbon monoxide and other constituents including methane. The process comprises subjecting the feed gas mixture at high pressure to partial condensation through a heat exchanger followed by separation to produce an impure hydrogen flow and a condensed fraction rich in carbon monoxide. The carbon monoxide is cryogenically purified from the condensed fraction by separation and removal of dissolved hydrogen. The hydrogen is sent to a washing column, and is then cryogenically purified by washing with nitrogen in the washing column while drawing off a liquid fraction rich in carbon monoxide at the base of the washing column. An ammonia synthesis mixture is produced by adding a nitrogen supplement taken from a high-pressure nitrogen stream, and from the hydrogen flow produced at the head of the washing column.

20 Claims, 9 Drawing Sheets

PROCESS AND PLANT FOR PRODUCTION OF CARBON MONOXIDE AND HYDROGEN

FIELD OF THE INVENTION

The current invention relates to the production of carbon monoxide.

It also relates to the production of a synthesis mixture ($N_2+3H_2$) which can be used for the production of ammonia, from a gas mixture of hydrogen and nitrogen.

The invention furthermore relates to a plant for such combined production, which can be integrated in particular in ammonia production equipment.

BACKGROUND OF THE INVENTION

Conventionally, carbon monoxide is obtained during the steam reforming or partial oxidation of hydrocarbons. It is possible to produce highly pure carbon monoxide with such units by using conventional purification techniques. These include cryogenic processes such as washing with liquid methane or partial condensation. Washing with methane makes it possible to produce highly pure carbon monoxide with, as by-product, impure hydrogen containing typically 1 to 2% methane.

This separation method makes it possible to obtain hydrogen under pressure and a very good carbon monoxide yield (up to 99%).

Partial condensation also makes it possible to produce highly pure carbon monoxide, as described in EP-A-0677483.

However, the carbon monoxide yield is generally not greater than 80% because of the losses with the hydrogen produced.

In order to increase the carbon monoxide yield, it is known in the art to lower the temperature of the condensation pot by reducing the pressure of the hydrogen flow escaping from the pot head. Another solution consists in recycling the impure hydrogen produced as a feed gas for the partial condensation unit.

These techniques are, however, expensive both in terms of the energy needed and investment.

In order to produce hydrogen with a purity suitable for the production of an ammonia synthesis mixture, cryogenic purification by washing with liquid nitrogen is conventionally used, as described in EP-A-0307983 and DE-A-3814293.

With this technique, pure hydrogen can be obtained from the synthesis gas output by a process of reforming or partially oxidizing hydrocarbons or coal.

Such a process is illustrated in FIG. 1 and will be described in brief below:

After removal of the soot at 1, and removal of the hydrogen sulphide at 2, from the mixture output by the step of partially oxidizing hydrocarbons or coal at 3, step 4 of converting the CO changes the majority of the CO present, under the action of steam, into carbon dioxide ($CO_2$) while producing hydrogen. After removal of $CO_2$ by absorption at 5, the gas mixture is subjected to a step 6 of washing with nitrogen.

The washing with nitrogen provides hydrogen under pressure at the column head, which has a high purity suitable for its use in the production of a synthesis mixture ($N_2+3H_2$), as well as a residual gas containing essentially carbon monoxide, hydrogen, methane and nitrogen.

FIG. 1 also represents the other operations of the ammonia synthesis; air distillation at 7, providing the oxygen needed for the partial oxidation 3 and the nitrogen needed for the washing 6; $NH_3$ synthesis proper at 8, from the synthesis mixture output by step 6, compressed at 9; steam expansion in a turbine 10 to drive the compressor 9; treatment of the hydrogen sulphide output by step 2, at 11, by a Claus process; and various heat exchanges 12 to 14.

In order to produce carbon monoxide in the particular case above, it is known in the prior art to treat the residue output by the nitrogen-washing step 6.

The residual gas is then used as the feed mixture for the carbon monoxide production process.

Such processes are described, in particular, in documents EP-A-00092770 and EP-A-0676373.

For the production of carbon monoxide by utilizing the by-product hydrogen, that is to say producing in parallel hydrogen under pressure with a purity sufficient for the preparation of a synthesis mixture, it has been proposed in the prior art to combine, with the step of washing with liquid methane for obtaining highly pure carbon monoxide, a subsequent step of washing with liquid nitrogen for purifying the hydrogen intended for the production of the synthesis mixture ($N_2+3H_2$).

SUMMARY OF THE INVENTION

The object of the present invention is to produce, on the one hand, carbon monoxide with a high purity suitable for other production processes and, on the other hand, to produce hydrogen under pressure with a high purity suitable for its use for the production of an ammonia synthesis mixture.

Another object of the present invention is to produce carbon monoxide from a feed gas mixture containing essentially carbon monoxide and hydrogen, as well as other constituents including methane, by utilizing the hydrogen available as a by-product of this carbon monoxide production process.

A further object of the invention is to provide a process for such production processes with reduced energy consumption and investment cost.

An additional object of the invention is to provide a plant for such combined production.

To this end, the present invention relates to a process for the combined production of carbon monoxide and an ammonia synthesis gas from a feed gas mixture containing essentially hydrogen, carbon monoxide and other constituents including methane, characterized in that it comprises the steps consisting in:

subjecting the feed gas mixture at high pressure to partial condensation by passing through a heat exchanger then separation in a separator pot, producing an impure hydrogen flow at the head, and a condensed fraction rich in carbon monoxide at the base;

purifying, cryogenically, the carbon monoxide from the said condensed fraction by separation under medium pressure in a first stripping column removing the dissolved hydrogen at the head, then by low-pressure distillation in a distillation column separating the methane at the base, from the base mixture resulting from the separation in the stripping column;

sending the hydrogen from the separator pot a washing column without heating it to ambient temperature;

purifying, cryogenically, the hydrogen from the impure hydrogen flow by washing with nitrogen in the washing column while drawing off a liquid fraction rich in carbon monoxide at the base of the said washing column; and producing an ammonia synthesis mixture by adding a nitrogen supplement taken from a high-pressure nitrogen stream, and from the hydrogen flow produced at the head of the washing column.

According to the invention, the operations of partial condensation and washing with nitrogen are carried out in the same plant.

The hydrogen is preferably sent to the washing column without being heated.

The invention also relates to a plant for the combined production of carbon monoxide and an ammonia synthesis mixture from a feed gas mixture containing essentially hydrogen, carbon monoxide and other constituents including methane, characterized in that comprises;

- a heat exchanger for partially condensing the feed gas mixture,
- a separator pot for separating an impure hydrogen flow at the head, from the partially condensed feed gas mixture,
- a medium-pressure first stripping column equipped with boiling means for separating the dissolved hydrogen at the head from the condensed base fraction of the separator pot, after the latter has had its pressure reduced in pressure-reducing means,
- a low-pressure distillation column equipped with boiling means for separating a flow rich in carbon monoxide at the head from the base flow of the stripping column, after the latter has had its pressure reduced in pressure-reducing means,
- a liquid-nitrogen washing column for separating a fraction rich in carbon monoxide at the base and a hydrogen flow at the head from the impure hydrogen flow produced at the head of the first stripping column,
- means for conveying the impure hydrogen flow from the separator pot to the washing column without heating it to ambient temperature,
- a source designed to provide a stream of nitrogen at high pressure,
- a line for sending a nitrogen supplement to the hydrogen flow produced at the head of the nitrogen-washing column in order to provide the ammonia synthesis mixture, and a single cold box containing all the elements above apart from the nitrogen source.

The inventors have demonstrated that it is possible to produce, in parallel, carbon monoxide with a purity suitable for its use in other production processes, with a high yield, and hydrogen with a purity suitable for its use in the production of an ammonia synthesis mixture, by utilizing the impure hydrogen output by a partial condensation step producing carbon monoxide directly from the feed mixture.

They have also demonstrated that such utilization can be carried out by performing a first separation of the carbon monoxide by partial condensation followed by an operation of washing with nitrogen, at reduced cost.

BRIEF DESCRIPTION OF THE DRAWINGS

An illustrative embodiment of the invention will now be described with reference to the appended figures, in which.

DETAILED DESCRIPTION OF THE INVENTION

A process will firstly be described with reference to FIGS. 2 to 6.

Figure 1:
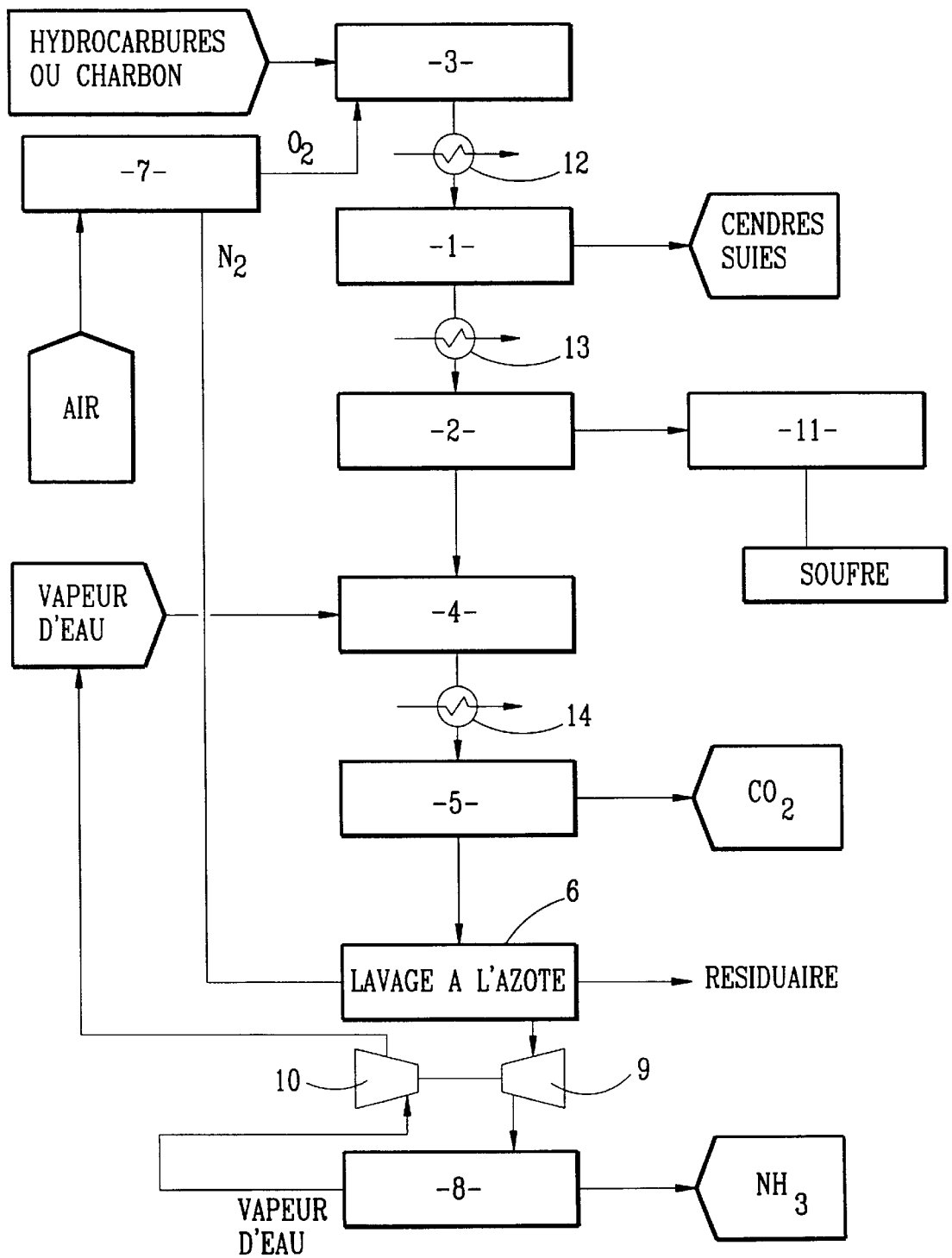
FIG. 1 schematically presents the conventional production of an ammonia synthesis mixture when the hydrogen is obtained by partial oxidation of hydrocarbons or coal.
Figure 2:
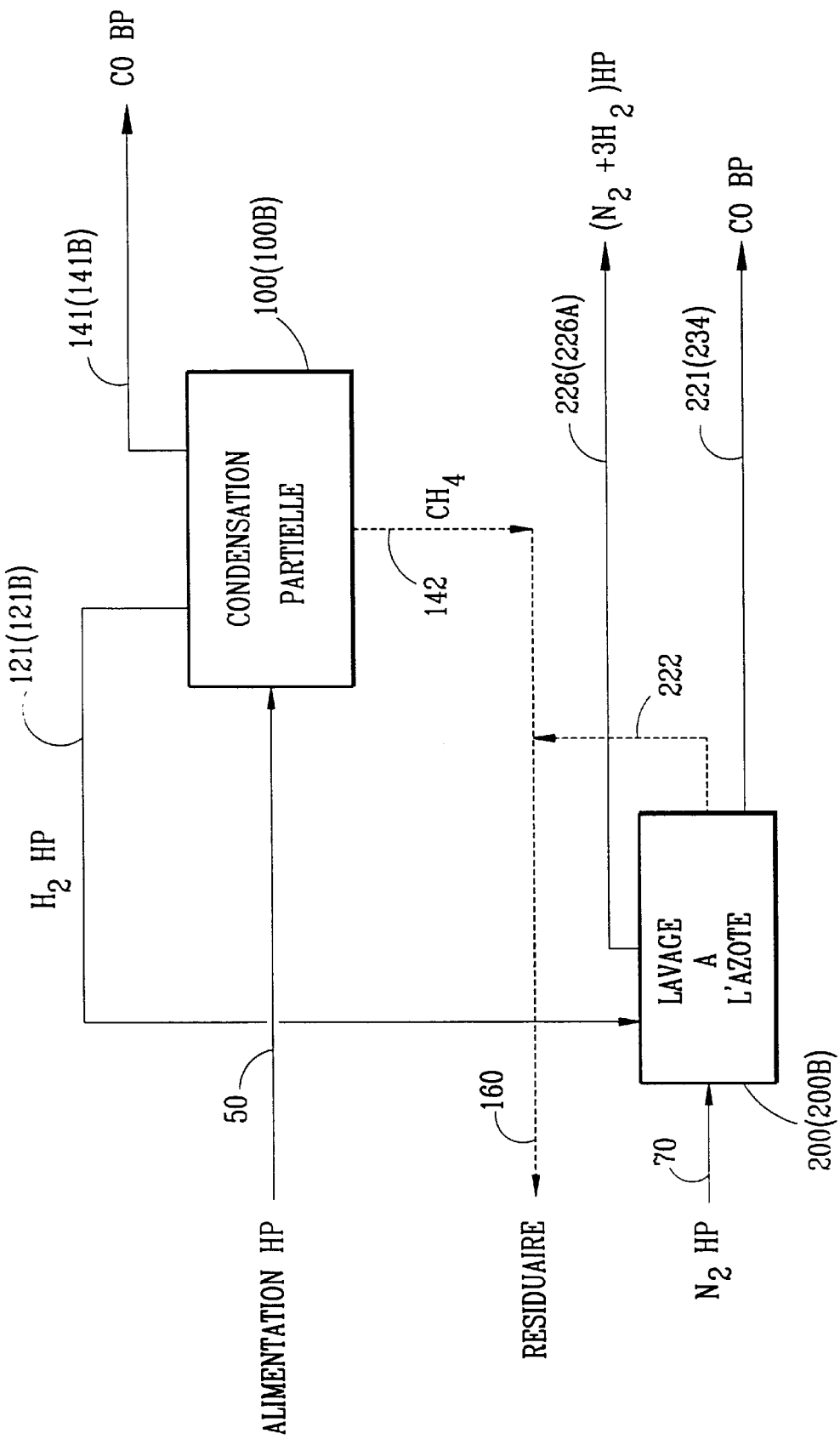
FIG. 2 schematically represents a first embodiment, according to which the operations of partial condensation and washing with liquid nitrogen are carried out in two successive plants.
Figure 3:
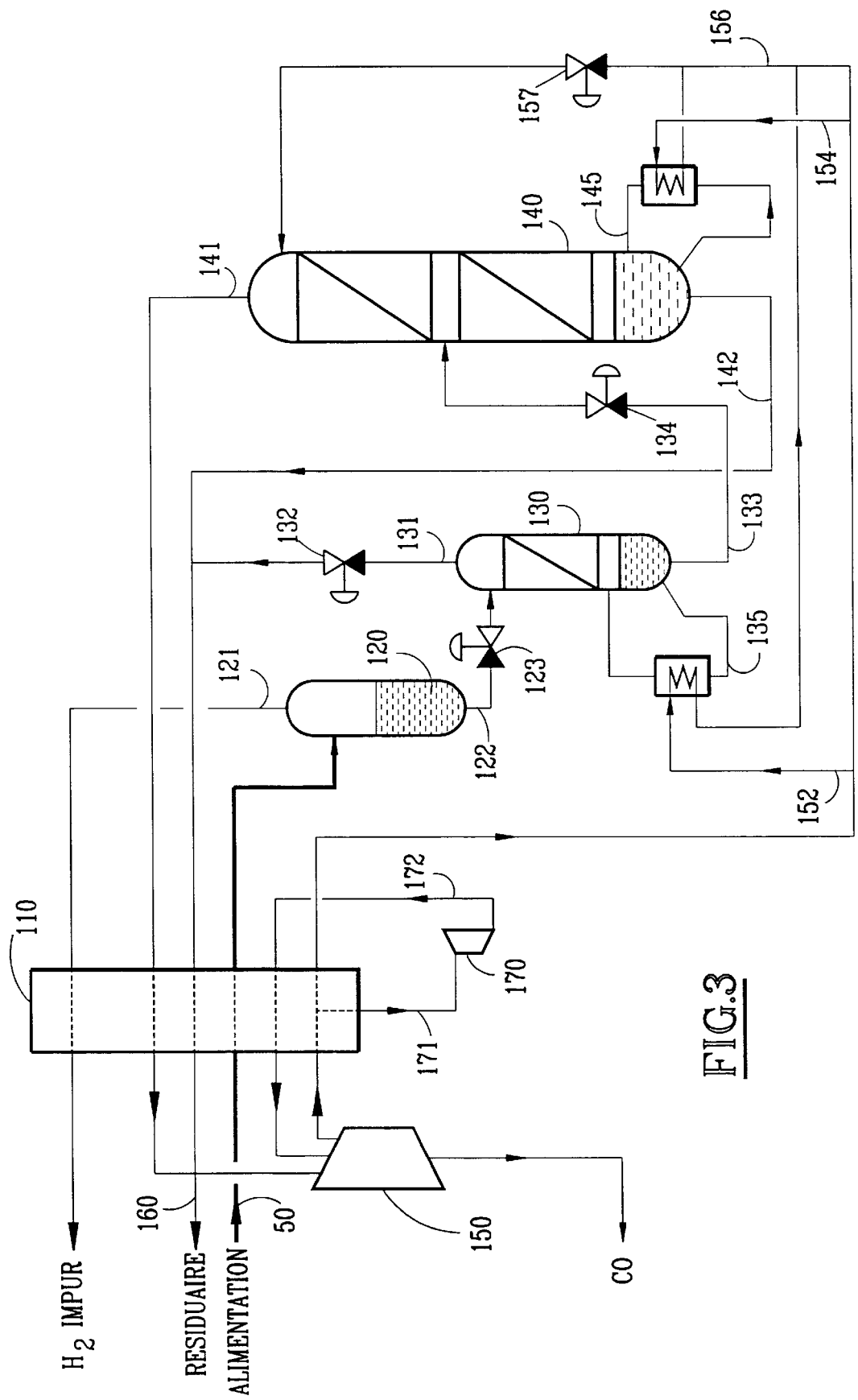
FIGS. 3 and 4 schematically represent, respectively, plants for the partial condensation and the washing with nitrogen in the process of FIG. 2.
Figure 4:
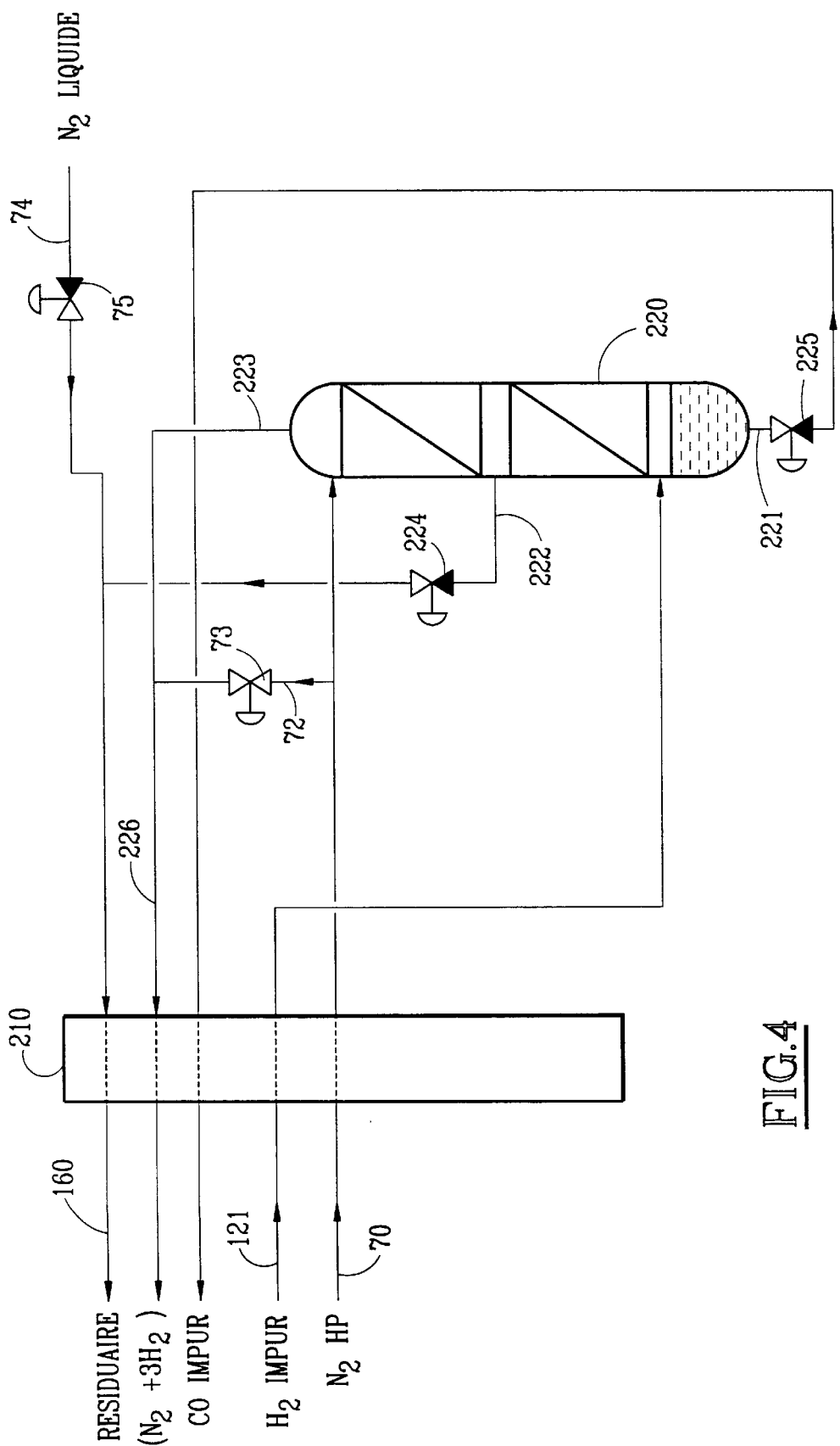

The plants represented in FIGS. 3 and 4 replace block 6 in FIG. 1. They correspond respectively to blocks 100 and 200 in FIG. 2, and constitute two successive cold boxes.

The plant 100 schematically represented in FIG. 3 is intended for the production of carbon monoxide from a feed gas mixture 50 consisting essentially of hydrogen, carbon monoxide and other constituents including methane.

The composition of the feed mixture 50 may vary depending on the type of process employed for generating the ammonia synthesis gas (steam reforming, partial oxidation, etc.).

At the output of block 5 in FIG. 1, the feed mixture is available at a pressure of between 10 bar and 100 bar and at ambient temperature, or at a lower temperature.

The plant 100 essentially comprises a heat exchanger 110 of the indirect countercurrent type, a separator pot 120, a stripping column 130 equipped with a base boiler 135 and a distillation column 140 equipped with a base boiler 145, as well as an expansion turbine 170.

The plant 100 operates according to the conventional principle of partial condensation, which is given below:

The feed gas mixture 50 is cooled in the heat exchanger 110 to the lowest possible temperature, the limit being defined by:

- the lowest vaporization pressure of liquid CO which can be achieved in the case of the production of impure hydrogen under pressure; this is the scheme described below.
- the solidification temperature of carbon monoxide, if lower temperatures are achieved by reducing the pressure of impure hydrogen.

The partial condensation of this mixture through the heat exchanger 110 makes it possible to separate impure hydrogen 121 in the separator pot 120.

The impure hydrogen 121 typically contains 2 to 10% carbon monoxide.

The liquid fraction 122 condensed in the pot 120, and collected at the base, contains essentially carbon monoxide and methane as well as dissolved residual hydrogen.

The dissolved hydrogen is separated after the liquid fraction 122 has had its pressure reduced to medium pressure (typically 7 to 15 bar) in a pressure-reducing valve 123 in the stripping column 130.

The separated hydrogen is collected at the head of the column 130 in the flow 131 which, after having its pressure reduced to low pressure in a pressure-reducing valve 132, is heated and sent to a residual network 160.

The liquid fraction 133 collected at the base of the column 130 is rich in carbon monoxide and also contains methane.

The latter is then separated by introduction at an intermediate position of the distillation column 140, after reduction of the pressure of the flow 133 to low pressure (typically 1 to 5 bar) in a pressure-reducing valve 134.

The carbon monoxide is produced at low pressure at the head of the column 140 in the flow 141.

The methane is separated and collected at the base of the column 140 in the flow 142 and sent to the residual network 160.

The cooling requirements are provided by an open CO cooling cycle as described below:

The carbon monoxide which is produced under low pressure in the flow 141 and is heated at 110 is compressed using a cycle compressor 150 and cooled in the heat exchanger 110.

A portion of this carbon monoxide, taken from the flows 152 and 154, is condensed in the base boilers 135 and 145 of the columns 130 and 140, respectively.

The carbon monoxide flow 156 furthermore has its pressure reduced in a pressure-reducing valve 157 and is vaporized at a low pressure at the head of the distillation column 140.

In order to balance the heat budget of the plant 100, a stream of high-pressure carbon monoxide 171, partially cooled in the heat exchanger 110, has its pressure reduced in a turbine 170 then is heated in the heat exchanger 110 before being recompressed using the cycle compressor 150.

The cooling cycle may be carried out using any other available fluid, or alternatively by vaporization of a cryogenic fluid.

Referring to FIG. 2, it can be seen that the plant 100 produces carbon monoxide at low pressure in the flow 141, and this can be used as the cycle fluid as indicated above or sent to other production processes.

An impure hydrogen fraction under the high pressure is produced in the flow 121, and essentially contains carbon monoxide (typically 2 to 10%) and, in particular, methane (typically less than 1%).

The fraction 121 is the direct source of the associated production of hydrogen with a purity suitable for its use in the production of an ammonia synthesis mixture. To this end, the impure hydrogen flow 121 output by the separator part 120 of the plant 100 is purified in a second plant 200, as indicated in FIG. 2.

The plant 200 schematically represented in FIG. 4 is thus intended for the production of an ammonia synthesis mixture ($N_2+3H_2$) and makes it possible, in parallel, to produce a second flow of carbon monoxide from the feed mixture 121 which consists essentially of hydrogen and may contain up to 10% of carbon monoxide as well as residual methane, as indicated above.

The plant 200 essentially comprises a heat exchanger 210 of the indirect countercurrent type, a source designed to provide a high-pressure nitrogen stream and a liquid-nitrogen washing column 220 equipped, in particular, with means for withdrawal at an intermediate position of the said washing column.

The plant 200 operates in the following way:

The impure hydrogen mixture 121 constituting the feed mixture at the high pressure (typically 10 to 100 bar) is cooled in the heat exchanger 210 to a temperature of the order of −180° C. then has its impurities (essentially CO and $CH_4$) washed out in the nitrogen-washing column 220.

The cooled impure hydrogen is then conveyed to the base of the washing column 220, at the inlet of which the impurities are partially condensed.

It is separated in the column 220 into a liquid fraction 221, collected at the base of the column, and a gas fraction.

The gas fraction, essentially consisting of hydrogen, is washed with the nitrogen 70 sent to the column head at the high pressure, after having previously been cooled and liquefied in the heat exchanger 210, and leaves this column at the head in the flow 223 consisting essentially of hydrogen and now containing only a few ppm (parts per million) of carbon monoxide and methane.

The hydrogen fraction 223 has a purity which is compatible with its use in the production of an ammonia synthesis mixture. It consists of about 90% hydrogen and 10% nitrogen.

It is supplemented by a nitrogen supplement 72 taken from the nitrogen stream 70, via a valve 73, to form the ammonia synthesis mixture 226 and is finally heated to ambient temperature in the heat exchanger 210.

Furthermore, a liquid fraction 222 is drawn off at an intermediate position of the column 220. This fraction is rich in hydrogen and relatively lean in carbon monoxide. It contains typically 75% nitrogen, 20% carbon monoxide and 5% methane.

The fraction 222 has its pressure reduced to a low pressure (typically 1 to 5 bar) in a pressure-reducing valve 224, then is vaporized and heated to ambient temperature in the heat exchanger 210 before being sent to the residual network 160 ("fuel gas").

The fraction 221 drawn off at the base of the washing column 220 is rich in carbon monoxide and lean in nitrogen. It contains typically 92% carbon monoxide, 6% hydrogen, 2% methane and 1% nitrogen.

This fraction 221 is, after having its pressure reduced in the pressure-reducing valve 225, advantageously extracted at the highest possible pressure compatible with the heat budget of the plant 200.

This heat budget may be balanced by a supplement of liquid nitrogen 74, with its pressure reduced to the low pressure in the pressure-reducing valve 75 or by any other means.

Referring to FIG. 2, it can be seen that the washing with nitrogen leads to the production of an ammonia synthesis mixture 226 and a fraction 221 which is the source of a second associated production process for carbon monoxide.

The two carbon monoxide flows produced may or may not be combined depending on their respective destinations.

According to the use envisaged for this carbon monoxide flow 221, it may be purified as described above, after having its pressure reduced in the pressure-reducing valve 225.

Figure 5:
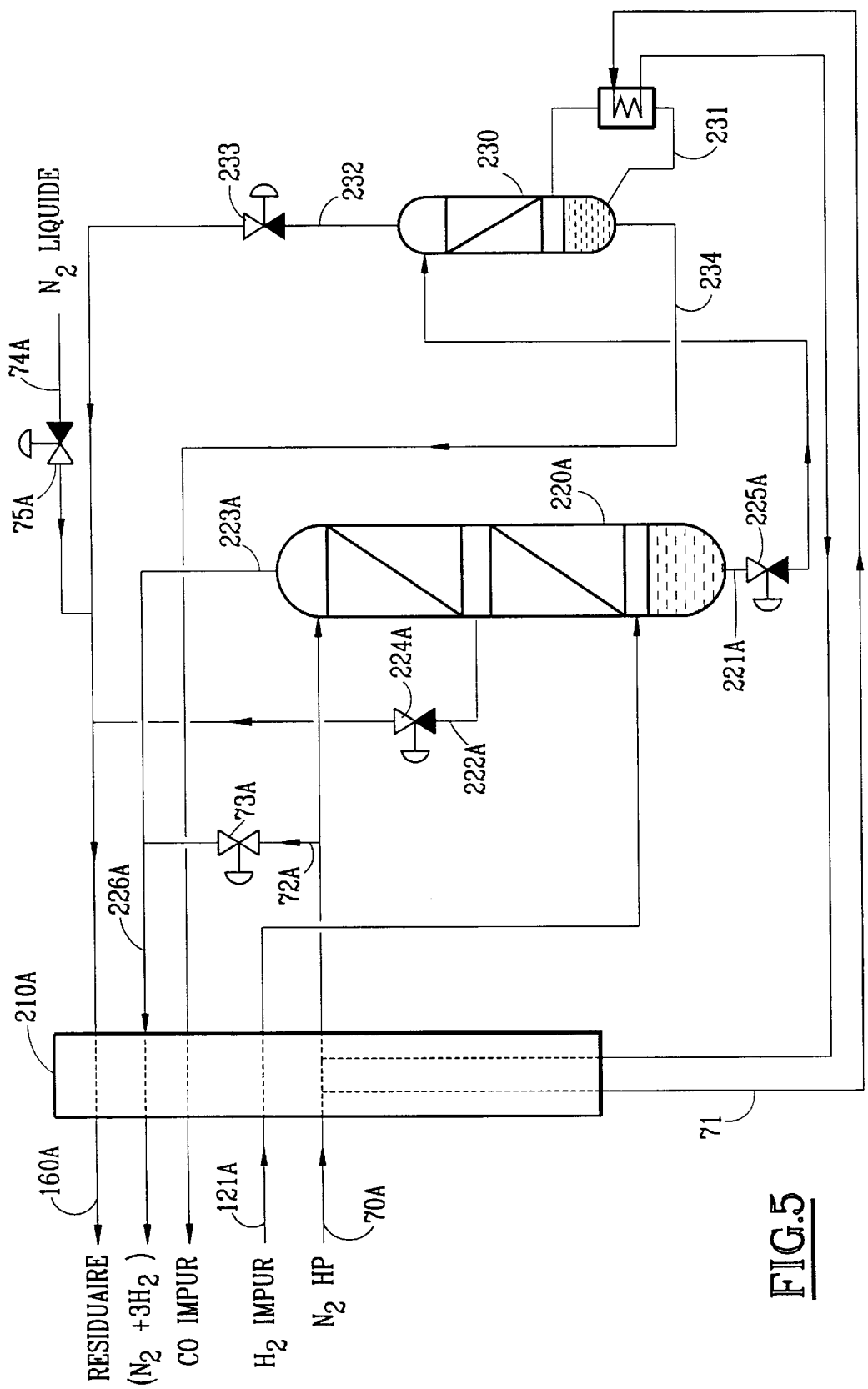
FIG. 5 is an alternative embodiment of FIG. 4.

The removal of the residual hydrogen is schematically represented in FIG. 5. This purification may be carried out in the same cold box constituting the plant 200, as indicated below.

For variant A in FIG. 5, in which complementary removal of the hydrogen from the flow output at the base of the nitrogen-washing column is carried out, the references in FIG. 4 are repeated with the additional index A to denote the elements common to these two alternative embodiments.

The plant 200A thus comprises, further to the heat exchanger 210A, the nitrogen-washing column 220A and the source designed to provide a high-pressure nitrogen stream 70A, a stripping column 230 equipped with a base boiler 231.

It operates in the following way:

The impure hydrogen flow 121A, containing essentially hydrogen, carbon monoxide (up to 10%) and residual methane, has its impurities washed out in the washing column 220 as described above.

The purified hydrogen is produced in the flow 223A then supplemented by a nitrogen supplement 72A to provide an ammonia synthesis mixture 226A.

Intermediate withdrawal 222A makes it possible to remove the majority of the nitrogen.

A fraction rich in carbon monoxide 221A is collected at the base.

It is rid of the hydrogen which is dissolved in it, by separation in the stripping column 230 after having its pressure reduced using a pressure-reducing valve 225A to a medium pressure (typically 5 to 15 bar) intermediate between the pressure of the column 220A and that of the residual network 160A.

The separated hydrogen is collected at the head of the column 230 in the flow 232 which, after having its pressure reduced to the low pressure in a pressure-reducing valve 233 is heated in the heat exchanger 210A and directed towards the residual network 160A.

A liquid fraction 234, consisting essentially of carbon monoxide and also containing the residual nitrogen and the other constituents initially present in the feed mixture 121A, including methane, is collected at the base of the column 230.

The stripping column 230 is heated by a portion 71 of the nitrogen at high pressure 70A, after partial cooling in the heat exchanger 210A.

The heat budget may be balanced by a supplement of liquid nitrogen 74A with its pressure reduced to the low pressure in the pressure-reducing valve 75A, or by any other means as described with reference to FIG. 4.

Figure 6:
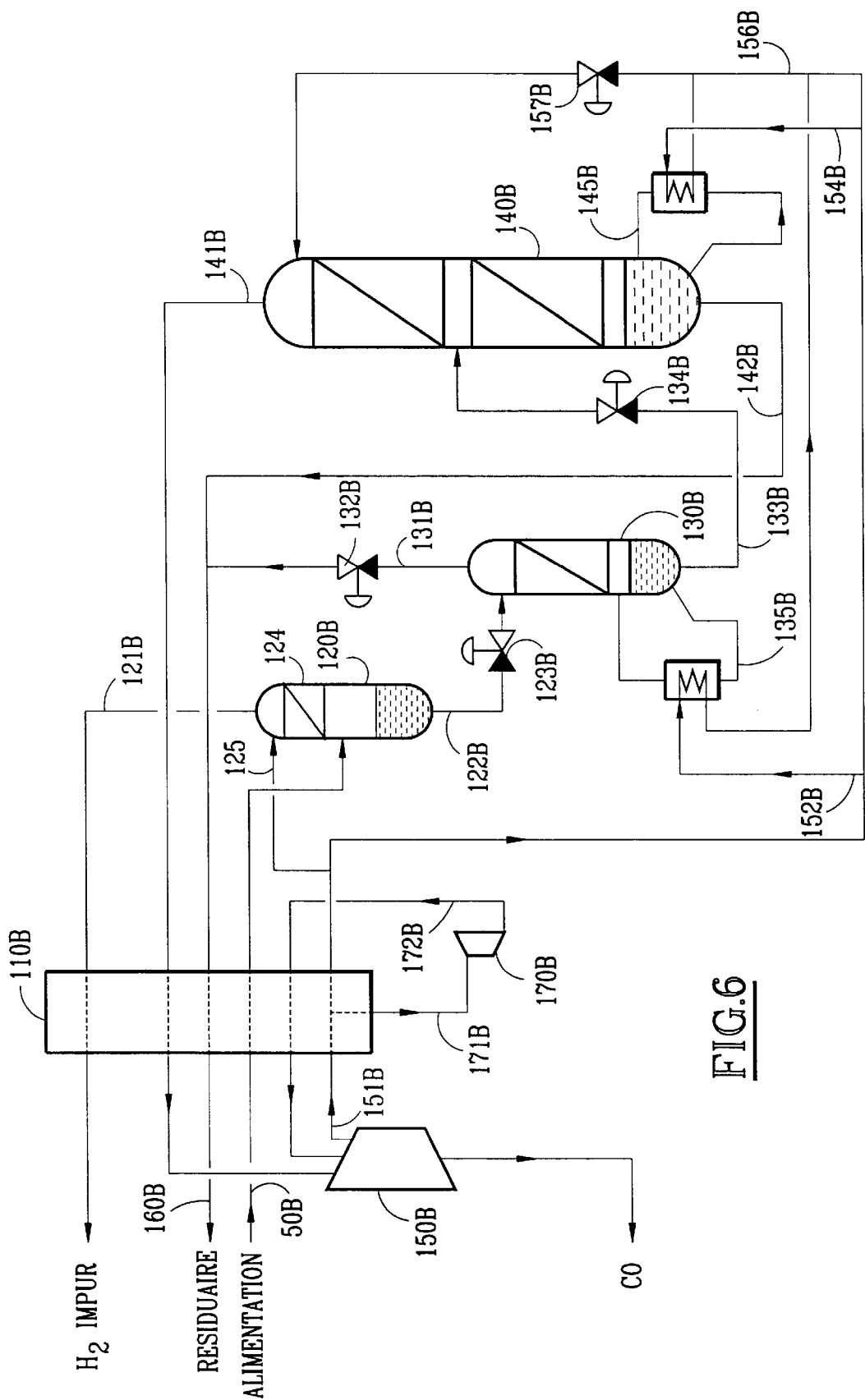
FIG. 6 is an alternative embodiment of FIG. 3.

If it is desirable for the CO produced by the washing with nitrogen to contain practically no methane, the methane may be removed from the impure hydrogen flow output by the partial condensation, in the plant 100B in FIG. 6.

For this variant B, schematically represented in FIG. 6, the references in FIG. 3 are repeated with the additional index B to denote the elements common to these two alternative embodiments.

The plant 100B comprises a separator pot 120B provided with plates or packing 124. It also comprises, in similar fashion to the plant 100, a heat exchanger 110B, a stripping column 130B equipped with a base boiler 135B and a distillation column 140B equipped with a base boiler 145B, as well as an expansion turbine 170B.

The plant 100B operates as indicated below:

The feed gas mixture 50B is cooled in the heat exchanger 110B and fed under high pressure to the separator pot 120B.

The partial condensation of this mixture in the exchanger 110B makes it possible to separate impure hydrogen 121B in the separator pot 120B.

In parallel, washing with carbon monoxide is carried out in the pot 120B by sending to the head a flow 125 of carbon monoxide taken from the flow 151B of carbon monoxide produced at the head of the column 140B after recompression using the cycle compressor 150B.

The impure hydrogen 121B collected at the head contains typically 10% CO and is rid of the methane initially present in the feed mixture 50B.

The liquid fraction 122B collected at the base contains essentially carbon monoxide as well as dissolved hydrogen.

This dissolved hydrogen is separated, after the fraction 122B has had its pressure reduced to the medium pressure in a pressure-reducing valve 123B, in the stripping column 130B as described with reference to FIG. 3.

The hydrogen is collected at the head of the column 130B in the flow 131B and is sent, after having its pressure reduced in a pressure-reducing valve 132B, to the residual network 160B.

The hydrogen 121B now contains practically no methane, in contrast to the fraction 121 in FIG. 3.

The residual methane can be separated in the distillation column 140B. It is collected at the base in the flow 142B and is sent to the residual network 160B.

The base boilers 135B and 145B are supplied with carbon monoxide 141B produced, respectively by the flows 152B and 154B, after recompression using the compressor 150B.

On leaving this plant, the hydrogen flow 121B produced is treated in a plant 200 as described above.

The main flows produced according to the aforementioned variants A and B are indicated between parentheses in FIG. 2.

The carbon monoxide produced contains nitrogen which was either present in the feed gas mixture or results from the washing with liquid nitrogen.

Depending on the economic benefit, this residual nitrogen may be removed using an additional cryogenic separation column (not shown), as is well known in the art.

According to a second embodiment of the invention, the operations of partial condensation and washing with nitrogen are integrated in the same cold box.

Figure 7:
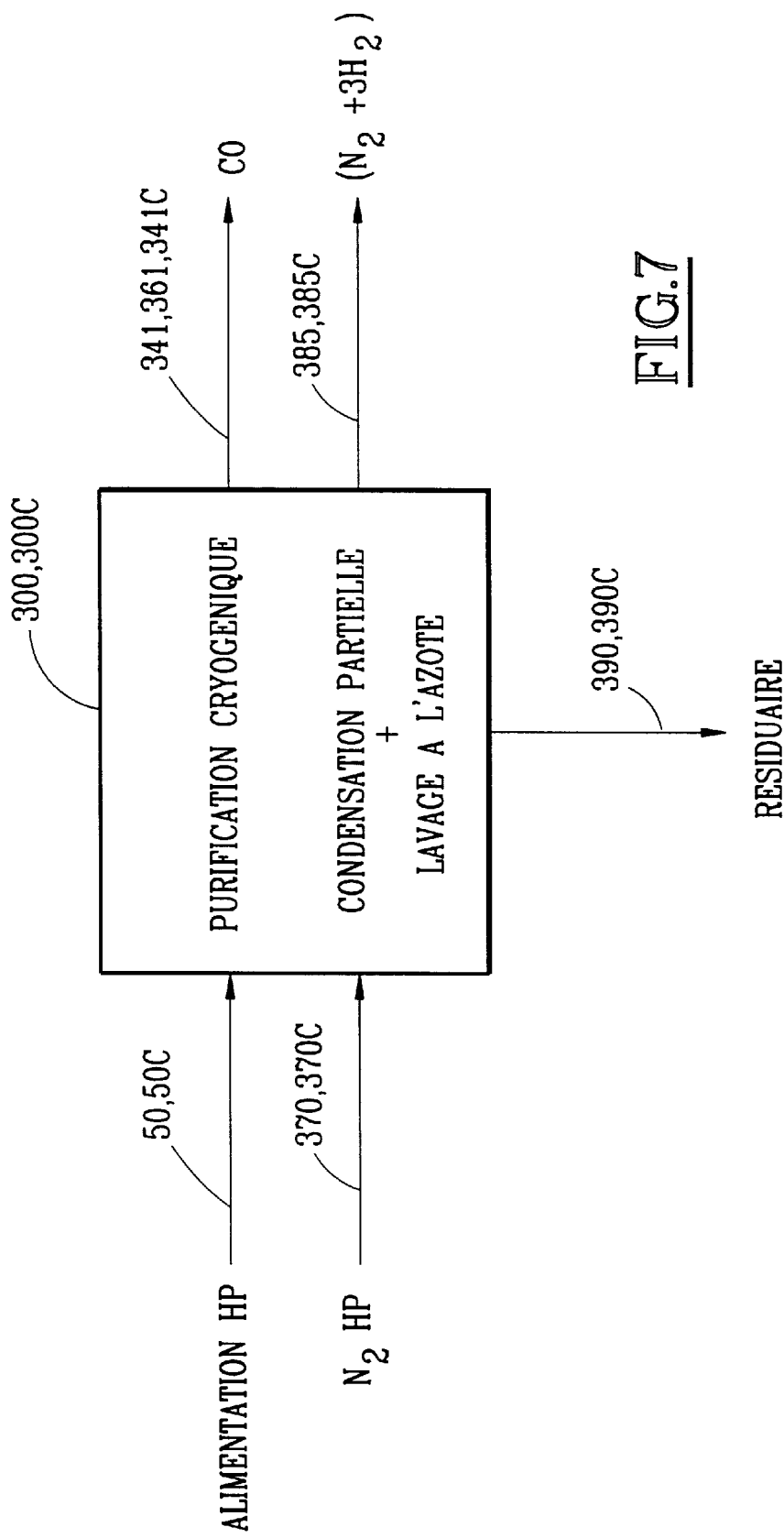
FIG. 7 schematically represents an embodiment of the invention according to which the operations of partial condensation and of washing with liquid nitrogen are carried out in the same plant.
Figure 8:
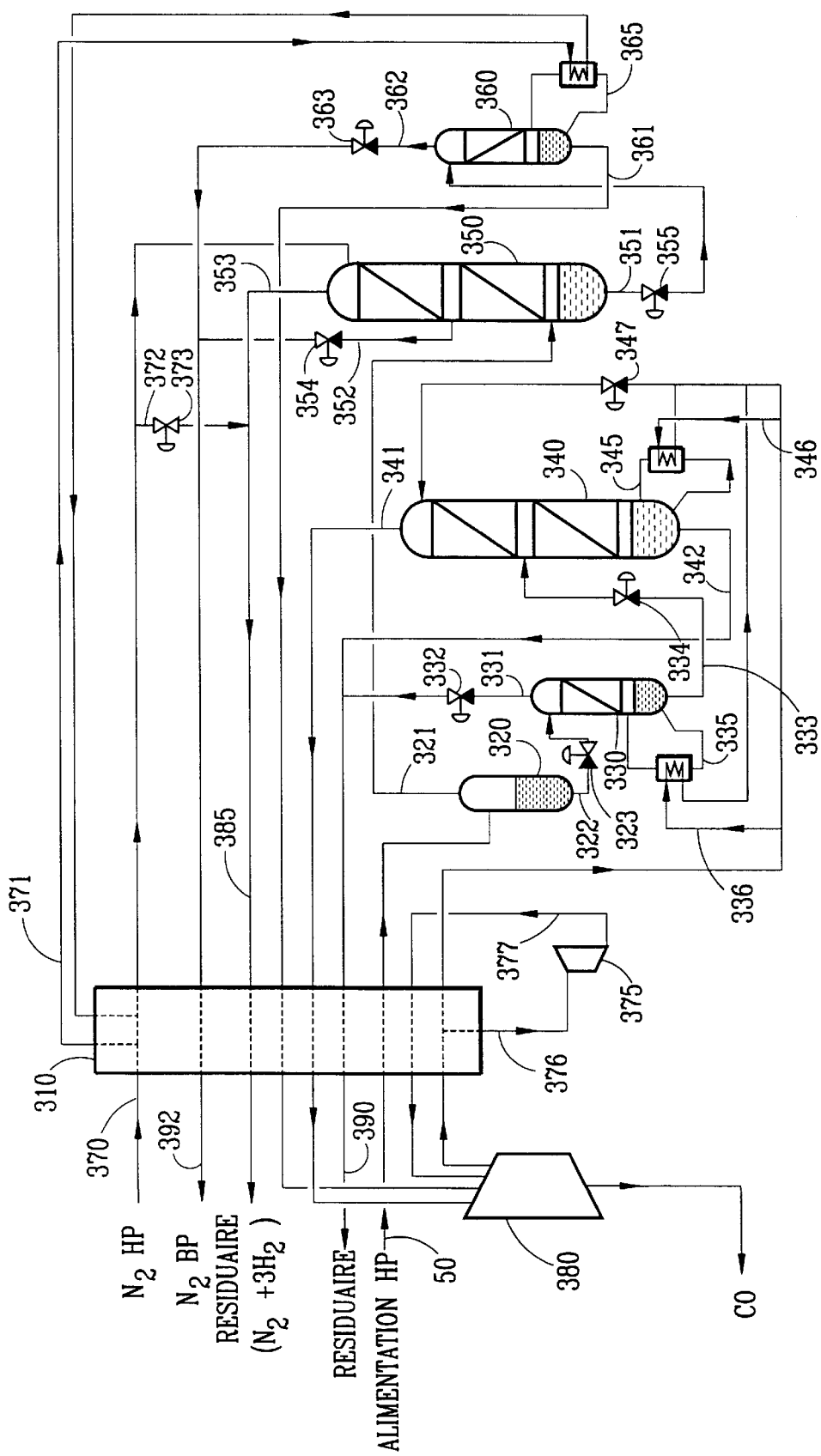
FIG. 8 schematically represents a plant for implementing the process in FIG. 7.

As illustrated in FIG. 7, these two operations are carried out using the plant 300 schematically represented in FIG. 8.

Referring to the conventional process for producing an ammonia synthesis mixture as illustrated in FIG. 1, the plant 300 replaces the block 6.

The plant 300 essentially comprises a heat exchanger 310 of the indirect countercurrent type, a separator pot 320 optionally equipped with plates or packing (not shown) for removing methane as described above, a first stripping column 330 provided with a base boiler 335, a distillation column 340, provided with a base boiler 345, a liquid-nitrogen washing column 350 and a second stripping column 360 provided with a base boiler 365 as well as a source designed to provide a high-pressure nitrogen stream 370, a turbo expander 375 and a cycle compressor 380.

The plant 300 operates as described above:

The ways in which the separator pot 320, the stripping column 330 and the distillation column 340 operate are similar to those described with reference to the plant in FIG. 3. The ways in which the nitrogen-washing column 350 and the stripping column 360 operate are similar to those described with regard to the plant in FIG. 5.

The feed gas mixture 50 is partially condensed by passing through the heat exchanger 310 and is separated in the separator pot 320 producing, at the head, an impure hydrogen flow 321 containing essentially carbon monoxide (about 10%) and other constituents including methane and, at the base, a flow rich in carbon monoxide 322 also containing methane and dissolved hydrogen.

The feed mixture 50 may, if appropriate, be rid of its methane as described with reference to FIG. 6.

The flow 322 from the base of the pot 320 is treated, after having its pressure reduced to medium pressure in a pressure-reducing valve 323, in the first stripping column 330 where it is rid of its dissolved hydrogen, which escapes at the head in the flow 331.

The latter has its pressure reduced in the pressure-reducing valve 332 before being heated in the exchanger 310, and sent to a residual network 390.

The fraction collected at the base 333 is conveyed, after having its pressure reduced to low pressure in the pressure-reducing valve 334, to an intermediate point of the low-pressure distillation column 340.

A fraction rich in carbon monoxide 341 is collected at the head of the column 340 and the methane is removed at the base in the fraction 342 and sent to the residual network 390 after having been mixed with the flow 331.

The impure hydrogen fraction 321 output by the separator pot 320 is directly conveyed to the base of the nitrogen-washing column 350, in the same cold box without being heated. It is here that the essential difference of this embodiment in comparison with the process in FIG. 2 is found.

This washing results in a purified hydrogen fraction 353 collected at the head, to which a nitrogen supplement 372 is added to produce an ammonia synthesis mixture 385. The mixture is heated in the exchanger 310.

The liquid fraction collected at the base 351 is rich in carbon monoxide and contains residual hydrogen as well as other constituents including methane and nitrogen.

An intermediate withdrawal 352 is provided as in the first embodiment (FIGS. 4 and 5) to remove the majority of the nitrogen and form residual nitrogen 392.

The fraction 351 is then rid of the hydrogen which it contains in the second stripping column 360, after having its pressure reduced in a pressure-reducing valve 355.

The hydrogen is collected in the flow 362 and has its pressure reduced in a pressure-reducing valve 363 before being sent to a low-pressure residual network 392.

The separating power is provided by means of a CO cycle supplied by the carbon monoxide produced at 341 and 361 and heated at 310, and compressed using the compressor 380. A delivery of carbon monoxide pressurized by the compressor constitutes an end product.

Cooling is effected by partially cooling CO compressed in the exchanger 310 and by reducing the pressure of the delivery 376 in a turbine 375. The delivery 377 with its pressure reduced is heated in the exchanger 310 and recycled to the compressor 380.

The base boilers 335 and 345 are supplied by a portion 336, 346 respectively of the cycle carbon monoxide.

The boilers may be supplied by other heat sources (synthesis gas for example) available at the required temperature level.

The base boiler 365 for the column 360 is, for its part, supplied by a portion 371 of the high-pressure nitrogen stream, partially cooled in the exchanger 310.

This "integrated" embodiment permits better combination of the refrigerants and heat sources and therefore a reduction in the irreversible heat exchange. This optimization of the inter-fluid heat exchanges allows the total energy consumption to be reduced substantially. This embodiment also makes it possible to reduce the investment cost.

Figure 9:
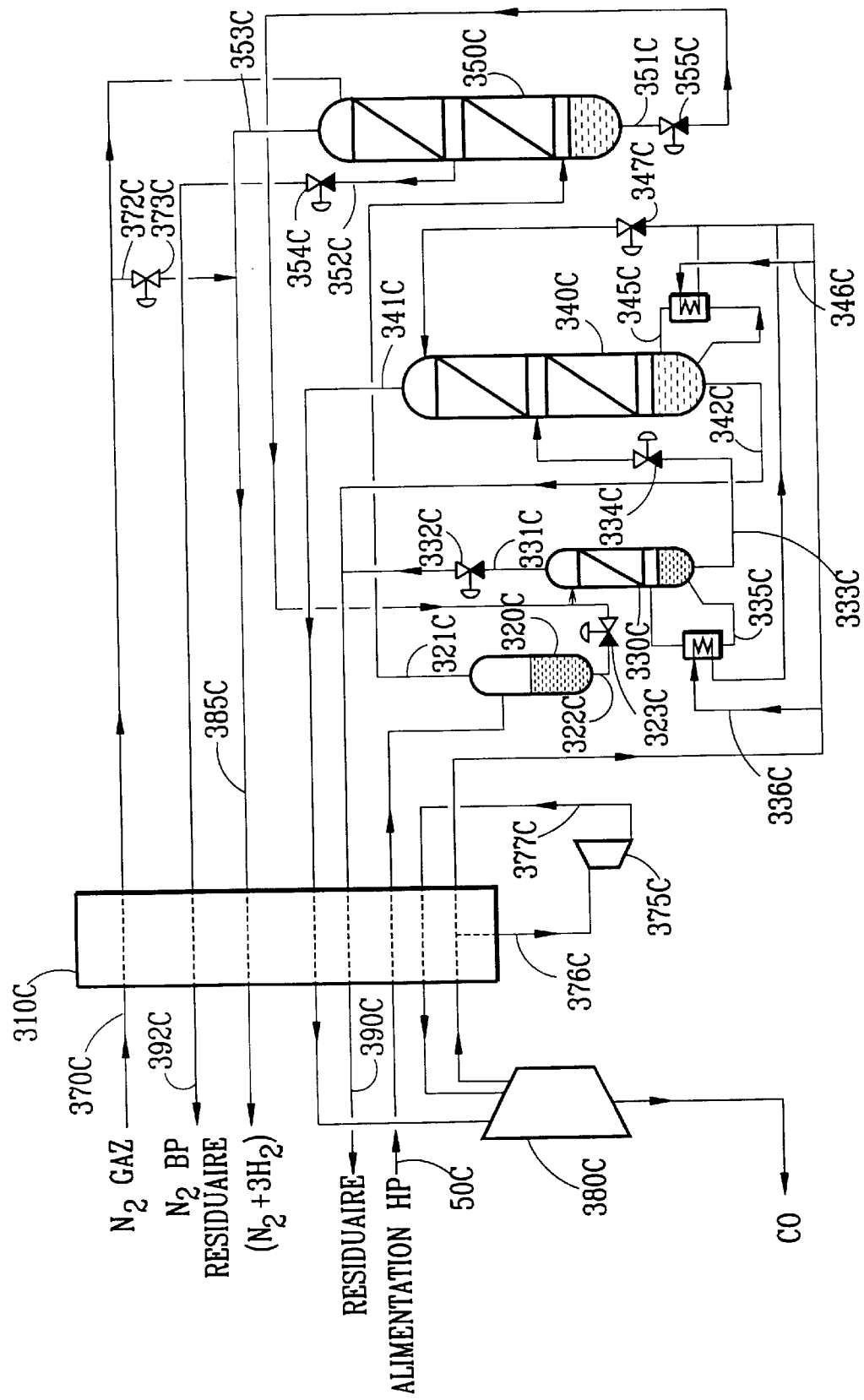
FIG. 9 is a variant of FIG. 8.

According to a variant C of this second embodiment of the invention, schematically represented in FIG. 9, the plant 300C is similar to the plant 300 in FIG. 8 but comprises only a single strip in column 330C for separating the dissolved hydrogen, instead of the columns 330 and 360 previously provided.

The common elements of the plants in FIGS. 8 and 9 have the same references, with an extra index C.

The plant 300 C furthermore comprises a line for conveying the base liquid fraction 351C at the head of the stripping column 330C after having its pressure reduced in a pressure-reducing valve 355C.

The plant 300C operates in a way similar to that in FIG. 8.

The only difference resides in the fact that the liquid fraction 351C collected at the base of the washing column 350C, which is rich in carbon monoxide and also contains nitrogen and dissolved hydrogen, is mixed with the flow 322C recovered at the base of the pot 320C, with its pressure reduced beforehand to the medium pressure in the pressure-reducing valve 323C, then rid of its dissolved hydrogen in the stripping column 330C.

The nitrogen source 371 used to supply the base boiler 365 of the stripping column 360 of the plant in FIG. 8 is therefore omitted.

This variant allows the investment cost and the energy consumption to be reduced further.

By way of comparison, the performance of the process according to the invention was evaluated in the case 1 of the successive partial condensation and nitrogen-washing and in the case 2 in which these operations are integrated in the same plant, in comparison with the case 3 of the prior art process which consists in firstly washing with liquid methane and then washing with nitrogen.

The feed gas 50 is a mixture output by a reforming process having an $H_2/CO$ ratio close to 3 and available under a pressure of 20 bar.

The carbon monoxide is produced with a minimum purity of 98.5% and contains less than 0.1% hydrogen. It is available under a pressure of 35 bar and the extraction yield is 97.5%.

An ammonia synthesis mixture is produced in parallel under a pressure of 18 bar and contains less than 10 ppm total impurities.

From the point of view of energy consumption, the concrete budgets are indicated in tables 1 to 3 below:

TABLE 1

| | Partial condensation followed by washing with nitrogen (case 1) | | | | | | | | | | |
|---|---|---|---|---|---|---|---|---|---|---|---|
| | Partial condensation (FIG. 3) | | | | Nitrogen washing (FIG. 5) | | | | | | Total CO |
| Fluid | Feed gas (50) | Impure $H_2$ (121) | CO produced (141) | Residue (160) | Feed gas (121A) | HP $N_2$ (70A) | CO produced (234) | $N_2 + 3H_2$ produced (226A) | Residue (160A) | Liquid $N_2$ (74A) | produced (141 + 234) |
| Composition mol % (dry) | 100.00 | 100.00 | 100.00 | 100.00 | 100.00 | 99.92 | 100.00 | 99.98 | 100.00 | 100.00 | 99.85 |
| | 71.08 | 90.42 | 0.01 | 12.84 | 90.42 | 0.00 | 0.00 | 74.99 | 12.80 | 0.00 | 0.00 |
| | 24.14 | 9.32 | 99.48 | 4.64 | 9.32 | 0.00 | 96.85 | 0.00 | 13.43 | 0.00 | 98.55 |
| | 0.00 | 0.00 | 0.00 | 0.00 | 0.00 | 0.00 | 0.00 | 0.00 | 0.00 | 0.00 | 0.00 |
| | 4.63 | 0.18 | 0.01 | 82.48 | 0.18 | 0.00 | 1.93 | 0.00 | 0.01 | 0.00 | 0.58 |
| | 0.15 | 0.08 | 0.50 | 0.03 | 0.08 | 99.92 | 1.22 | 24.99 | 73.77 | 100.00 | 0.72 |

TABLE 1-continued

Partial condensation followed by washing with nitrogen (case 1)

| | | Partial condensation (FIG. 3) | | | | Nitrogen washing (FIG. 5) | | | | | | Total CO produced (141 + 234) |
|---|---|---|---|---|---|---|---|---|---|---|---|---|
| Fluid | | Feed gas (50) | Impure $H_2$ (121) | CO produced (141) | Residue (160) | Feed gas (121A) | HP $N_2$ (70A) | CO produced (234) | $N_2$ + 3$H_2$ produced (226A) | Residue (160A) | Liquid $N_2$ (74A) | |
| Partial flow rate | m³ [stp]/h | | | | | | | | | | | |
| | | 76055.6 | 75306.5 | 1.0 | 748.1 | 75306 | 0.0 | 0.0 | 74954.8 | 351.7 | 0.0 | 1.0 |
| | | 25829.8 | 7764.3 | 17795.0 | 270.5 | 7764.3 | 0.0 | 7395.1 | 0.2 | 369.0 | 0.0 | 25190.1 |
| | | 0.0 | 0.0 | 0.0 | 0.0 | 0.0 | 0.0 | 0.0 | 0.0 | 0.0 | 0.0 | 0.0 |
| | | 4954.1 | 147.3 | 1.7 | 4805.1 | 147.3 | 0.0 | 147.1 | 0.0 | 0.2 | 0.0 | 148.8 |
| | | 160.5 | 68.4 | 90.3 | 1.8 | 68.4 | 26285.0 | 93.1 | 24983.3 | 2027.0 | 750.0 | 183.4 |
| Pressure | bar abs. | 20.0 | | | | | 20.0 | | 18.0 | | | 37.3 |
| Temperature | ° C. | 40.0 | | | | | 36.0 | | 35.0 | | | 36.0 |
| Total flow rate | m³ [stp]/h | 107000.0 | 83286.5 | 17888.0 | 5825.5 | 83286.5 | 26305.0 | 7635.3 | 99956.3 | 2747.9 | 750.0 | 25560.6 |

CO yield: 97.5%
Energy consumed: 6100 kW

TABLE 2

Partial condensation and washing with nitrogen in the same plant (case 2)

Partial condensation + washing with nitrogen (FIG. 8)

| Fluid | | Feed gas (50) | $N_2$ gas (370) | CO produced (341) + (361) | $N_2$ + $H_2$ produced (385) | Residue (390) | Residue (392) |
|---|---|---|---|---|---|---|---|
| Composition (dry) | mol % | 100.00 | 99.92 | 99.85 | 99.98 | 100.00 | 100.00 |
| $H_2$ | | 71.8 | 0.00 | 0.00 | 74.99 | 12.84 | 17.60 |
| CO | | 24.14 | 0.00 | 98.55 | 0.00 | 4.64 | 18.47 |
| $CO_2$ | | 0.00 | 0.00 | 0.00 | 0.00 | 0.00 | 0.00 |
| $CH_4$ | | 4.63 | 0.00 | 0.58 | 0.00 | 82.48 | 0.01 |
| $N_2$ | | 0.15 | 99.92 | 0.72 | 24.99 | 0.03 | 63.92 |
| Partial flow rate | m³ [stp]/h | | | | | | |
| $H_2$ | | 76055.6 | 0.0 | 1.0 | 74954.8 | 748.1 | 351.7 |
| CO | | 25829.8 | 0.0 | 25190.1 | 0.2 | 270.5 | 369.0 |
| $CO_2$ | | 0.0 | 0.0 | 0.0 | 0.0 | 0.0 | 0.0 |
| $CH_4$ | | 4954.1 | 0.0 | 148.8 | 0.0 | 4805.1 | 0.2 |
| $N_2$ | | 160.5 | 26285.0 | 183.4 | 24983.3 | 1.8 | 1277.0 |
| Pressure | bar abs. | 20.0 | 20.0 | 37.3 | 18.0 | | |
| Temperature | ° C. | 40.0 | 36.0 | 36.0 | 35.0 | | |
| Total flow rate | m³ [stp]/h | 107000.0 | 26305.0 | 25560.6 | 99956.3 | 5825.5 | 1997.9 |

CO yield: 97.5%
Energy consumed: 4600 kW

TABLE 3

Washing with methane followed by washing with nitrogen (case 3)

| | | Washing with methane | | | | Washing with nitrogen | | | | |
|---|---|---|---|---|---|---|---|---|---|---|
| Fluid | | Feed gas | $H_2$ produced | CO produced | Residue | Feed gas = $H_2$ (1) | $N_2$HP | $N_2$ + 3$H_2$ produced | Liquid $N_2$ | Residue |
| Composition (dry) | mol % | 100.00 | 100.00 | 99.85 | 100.00 | 99.97 | 100.00 | 99.98 | 100.00 | 100.00 |
| $H_2$ | | 71.22 | 97.3 | 0.01 | 26.76 | 97.90 | 0.00 | 74.99 | 0.00 | 1.97 |

TABLE 3-continued

Washing with methane followed by washing with nitrogen (case 3)

| | | Washing with methane | | | | Washing with nitrogen | | | |
|---|---|---|---|---|---|---|---|---|---|
| Fluid | | Feed gas | $H_2$ produced | CO produced | Residue | Feed gas = $H_2$ (1) | $N_2$HP | $N_2 + 3H_2$ produced | Liquid $N_2$ | Residue |
| CO | | 23.99 | 0.38 | 98.85 | 6.59 | 0.38 | 0.00 | 0.00 | 0.00 | 9.07 |
| $CO_2$ | | 0.00 | 0.00 | 0.00 | 0.00 | 0.00 | 0.00 | 0.00 | 0.00 | 0.00 |
| $CH_4$ | | 4.64 | 1.66 | 0.48 | 66.60 | 1.66 | 0.00 | 0.00 | 0.00 | 39.96 |
| $N_2$ | | 0.15 | 0.04 | 0.51 | 0.05 | 0.04 | 100.00 | 24.99 | 100.00 | 49.01 |
| Partial flow rate | $m^3$ [stp]/h | | | | | | | | | |
| $H_2$ | | 76134.2 | 74695.9 | 2.5 | 1435.8 | 74695.9 | 0.0 | 74633.4 | 0.0 | 62.5 |
| CO | | 25645.3 | 287.2 | 25004.6 | 353.5 | 287.2 | 0.0 | 0.0 | 0.0 | 287.2 |
| $CO_2$ | | 0.0 | 0.0 | 0.0 | 0.0 | 0.0 | 0.0 | 0.0 | 0.0 | 0.0 |
| $CH_4$ | | 4960.2 | 1265.9 | 121.0 | 3573.3 | 1265.9 | 0.0 | 0.0 | 0.0 | 1265.9 |
| $N_2$ | | 160.4 | 28.4 | 129.4 | 2.5 | 28.4 | 25600.0 | 24875.8 | 800.0 | 1552.6 |
| Pressure | bar abs. | 20.0 | | 37.3 | | 20.0 | | 18.0 | | |
| Temperature | °C. | 40.0 | | 36.0 | | 36.0 | | 35.0 | | |
| Total flow rate | $m^3$ [stp]/h | 106900.0 | 76277.4 | 25294.8 | 5365.1 | 76297.4 | 25600.0 | 99527.2 | 800.00 | 3168.2 |

CO yield: 97.5%
Energy consumed: 9000 kW

It can be seen from these tables that:

the energy saving obtained with the scheme in case 1 compared with that in the prior art of case 3 is more than 30%;

the energy saving obtained with the scheme in case 2 compared with that of case 1 is more than 20%.

From the point of view of investment cost:

the investment saving with the scheme in case 1 compared with that in the prior art of case 3 is more than 20%;

the investment saving with the scheme in case 2 compared with that of case 1 is more than 30%;

The process according to the invention makes it possible to produce carbon monoxide in two flows, as well as an ammonia synthesis mixture.

The inventors have shown that it is possible to ultilize the hydrogen obtained during the production of carbon monoxide from a feed gas mixture output by an initial step of partially oxidizing hydrocarbons or coal, or steam reforming.

They have furthermore shown that, by combining a nitrogen-washing operation with the conventional operation of partial condensation for producing carbon monoxide, it is unexpectedly possible to obtain an ammonia synthesis mixture and carbon monoxide with high purity (>99%) while substantially reducing the investment and energy costs, without the need to optimize the yield of the production of carbon monoxide by partial condensation as taught by the prior art.

| | Key for figures |
|---|---|
| FIG. 1 | Hydrocarbon - hydrocarbons or carbon |
| | cendres - ashes |
| | suies - soot |
| | air - air |
| | vapeur d'eau - steam |
| | soufre - sulphur |
| | lavage à l'azote - washing with nitrogen |
| | residuaire - residue |
| | ($N_2$ + 3$H_2$) HP → HP ($N_2$ + 3$H_2$) |

-continued

| | Key for figures |
|---|---|
| | CO BP → CP CO |
| | $N_2$HP → HP $N_2$ |
| FIG. 2 | Alimentation HP - HP feed |
| | Condensation partielle - partial condensation |
| | Résiduaire - residue |
| | Lavage à l'azote - washing with nitrogen |
| FIG. 3 | $H_2$ impur - impure $H_2$ |
| | Résiduaire - residue |
| | Alimentation - feed |
| FIG. 4 & 5 | Résiduaire - ↑ |
| | Co impur - impure Co |
| | $H_2$ impur - impure $H_2$ |
| | $N_2$ liquide - liquid $N_2$ |
| | $N_2$ HP - HP $N_2$ |
| FIG. 6 | H2 impur ↑ |
| | Résiduaire ↑ |
| | Alimentation ↑ |
| FIG. 7 | Alimentation HP ↑ |
| | Purification Cryogénique - cryogenic purification |
| | Condensation partielie - partial condensation |
| | + + |
| | Lavage à l'azote - washing with nitrogen |
| | residuaire ↑ |
| | $N_2$HP ↑ |
| FIG. 8 | Résiduaire, alimentation HP ↑ ↑ HP, BP ↑ |
| FIG. 9 | Résiduaire, alimentation HP ↑ |
| | $N_2$ Gaz - $N_2$ gas |

What is claimed is:

1. Process for the combined production of carbon monoxide and an ammonia synthesis gas from a feed gas mixture (50) containing essentially hydrogen, carbon monoxide and other constituents including methane, characterized in that it comprises the steps consisting in:

subjecting the feed gas mixture (50) at high pressure to partial condensation by passing through a heat exchanger (310:310C) then separation in a separator pot (320:320C), producing an impure hydrogen flow (321:321C) at the head, and a condensed fraction (322, 322C) rich in carbon monoxide at the base;

purifying, cryogenically, the carbon monoxide from the said condensed fraction (322;322C) by separation under medium pressure in a first stripping column (330;330C) removing the dissolved hydrogen at the head, then by low-pressure distillation in a distillation column (340;340C) separating the methane at the base, from the base mixture (333;333C) resulting from the separation in the stripping column (330;330C);

sending the hydrogen from the separator pot to a washing column without heating it to ambient temperature;

purifying, cryogenically, the hydrogen from the impure hydrogen flow (321,321C) by washing with nitrogen in the washing column (350;350C) while drawing off a liquid fraction (351;351C) rich in carbon monoxide at the base of the said washing column (350;350C); and producing an ammonia syntheses mixture (385;385C) by adding a nitrogen supplement (372;372C) taken from a high-pressure nitrogen stream (370;370C), and from the hydrogen flow (353;353C) produced at the head of the washing column (350;350C), the steps of partial condensation and washing with nitrogen being carried out in the same plant (300,300C).

2. Process according to claim 1, characterized in that a second liquid fraction (352;352C) is drawn off at an intermediate position of the said washing column (350;350C).

3. Process according to claim 1, characterized in that the fraction (351) rich in carbon monoxide collected at the base of the nitrogen-washing column (350) is purified, cryogenically, in a low-pressure second stripping column (360), separating the dissolved hydrogen at the column head.

4. Process according to claim 3, characterized in that a portion (371) of a high-pressure nitrogen stream (370) is used, after having been partially cooled in the heat exchanger (310), to supply the base boiler (365) of the low-pressure stripping column (360).

5. Process according to claim 1, characterized in that the feed mixture (50B) is partially condensed in the heat exchanger (110B) and separated in the separator pot (121E), which is provided with plates or packing (124), by washing with carbon monoxide (125), producing a practically methane-free impure hydrogen flow (121B) at the head.

6. Process according to claim 5, characterized in that a portion (125) of the carbon monoxide flow (141B) produced at the head of the distillation column (140B), heated, compressed and partially condensed through the heat exchanger (110B), is taken and sent to the head of the separator pot (120B).

7. Process according to claim 1, characterized in that the hydrogen produced at the head of the washing column (350;350C) is heated in the heat exchanger (310;310C), optionally after having been mixed with the nitrogen supplement (372;372C).

8. Process according to claim 1, characterized in that the high-pressure nitrogen liquefies in the heat exchanger (310;310C) and is sent to the head of the washing column (350;350C) and optionally to the hydrogen output produced at the head of the washing column.

9. Process according to claim 8, characterized in that the fraction (351C) rich in carbon monoxide collected at the base of the nitrogen-washing column (350C) is purified, cryogenically, in the first stripping column (330C) after having its pressure reduced to the medium pressure and mixed with the fraction (322C) which is collected at the base of the separator pot (320C) and has its pressure reduced beforehand to the said medium pressure.

10. Process according to claim 1, characterized in that a portion (336, 346; 336C, 346C) of the carbon monoxide produced (431;341C) at the head of the distillation column (140, 140B, 340, 340C) is heated, compressed using a cycle compressor (360, 380C) and used as the cycle fluid to supply the base boilers (335, 345; 335C, 345C) respectively of the first stripping column (330, 330C) and of the distillation column (140, 140B, 340, 340C).

11. Process according to claim 10, characterized in that a portion (376; 376C) of the compressed carbon monoxide has its pressure reduced in a turbine (375; 375C) to contribute to the cooling power needed for the separation steps.

12. Plant for the combined production of carbon monoxide and an ammonia synthesis mixture from a feed gas mixture (50) containing essentially hydrogen, carbon monoxide and other constituents including methane, characterized in that it comprises;

a heat exchanger (310;310C) for partially condensing the feed gas mixture (50), a separator pot (320; 320C) for separating an impure hydrogen flow (121; 121B; 321; 321C) at the head, from the partially condensed feed gas mixture (50), a medium-pressure first stripping column (330; 330C) equipped with boiling means (335; 335C) for separating the dissolved hydrogen at the head from the condensed base fraction (322; 322C) of the separator pot (320; 320C), after the latter has had its pressure reduced in pressure-reducing means (323; 323C)

a low-pressure distillation column (340; 340C) equipped with boiling means (145; 145B; 345; 345C) for separating a flow rich in carbon monoxide (141; 141B; 341; 341C) at the head from the base flow (133; 133B; 333; 333C) of the first stripping column, after the latter has had its pressure reduced in pressure-reducing means (134; 134B; 334; 334C), a liquid-nitrogen washing column (360; 350C) for separating a fraction (351; 351C) rich in carbon monoxide at the base and a hydrogen flow (353; 353C) at the head from the impure hydrogen flow (321; 321C) produced at the head of the first stripping column 330; 330C), means for conveying the impure hydrogen flow from the head of the stripping column to the washing column without heating it to ambient temperature, a source designed to provide a stream of nitrogen at high pressure (70; 70A; 370; 370C), a line for feeding a nitrogen supplement (372; 372C) to the hydrogen flow (353; 353C) produced at the head of the nitrogen-washing column (350; 350C) in order to provide the ammonia synthesis mixture, and a single cold box containing all the elements above apart from the nitrogen source.

13. Plant according to claim 12, characterized in that the nitrogen-washing column 350; 350C) is provided with means for intermediate withdrawal of a liquid fraction (352; 352C).

14. Plant according to claim 12, characterized in that it includes a cooling cycle which comprises a cycle compressor (380; 380C) and uses the carbon monoxide (341; 341C) produced at the head of the distillation column under low pressure, and optionally the base liquid from the second stripping column following a vaporization step (340; 340C), to supply the boiling means (335 and 345; 335C and 345) of the first stripping column (330; 330C; and of the distillation column (340; 340C).

15. Plant according to claim 12, characterized in that it comprises a second stripping column (230; 360), equipped with boiling means (231; 365), for separating the dissolved hydrogen (232; 362) at the head from the flow rich in carbon monoxide 221A; 351) output at the base of the nitrogen-washing column (220A; 350).

16. Plant according to claim 15, characterized in that it includes an open nitrogen cycle using nitrogen at high pressure (70A; 370) to supply the boiling means (231; 365) of the second stripping column (230; 360).

17. Plant according to claim 14, characterized in that the separator pot (120B) is equipped with plates or packing (124 and means for washing with carbon monoxide (125) in order to produce a practically methane-free impure hydrogen flow (121B) at the head.

18. Plant according to claim 17 taken together, characterized in that the means for washing with carbon monoxide comprise a line for feeding a portion (125) of the carbon monoxide from the cooling cycle to the head of a separator pot (120B).

19. Plant according to claim 12, characterized n that it comprises a feed line for mixing the base liquid (351) of the washing column (350C) with the condensed base fraction (322C) of the separator pot (320C), in order to supply the stripping column (330C) at the head.

20. Plant according to claim 12, characterized in that the separator pot (120B) is equipped with plates or packing (124) and means for washing with carbon monoxide (125) in order to produce a practically methane-free impure hydrogen flow (121B) at the head.

* * * * *